O. WATERS.
VEHICLE SPRINGS.
APPLICATION FILED MAY 12, 1913.
1,105,010.
Patented July 28, 1914.
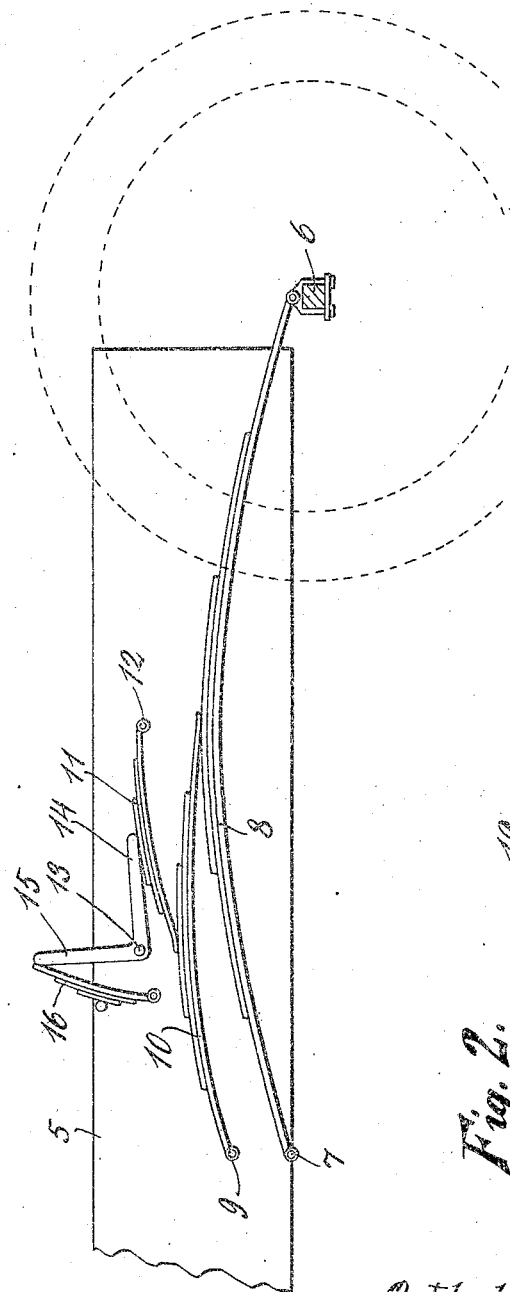
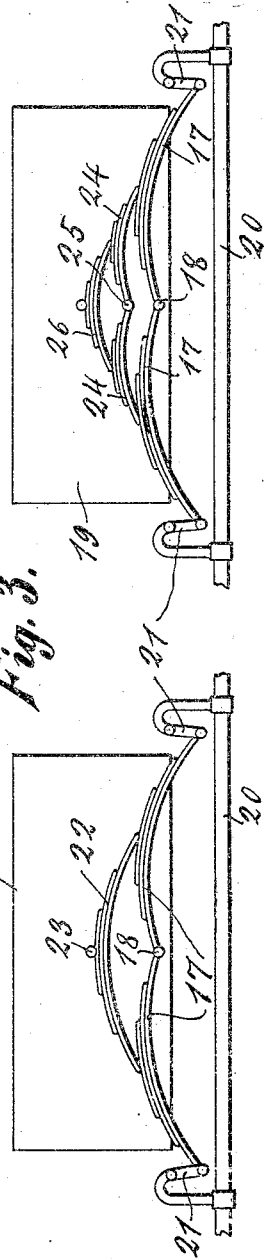
WITNESSES:
INVENTOR
Orthello Waters.
BY
ATTORNEY

UNITED STATES PATENT OFFICE.

ORTHELLO WATERS, OF LONG BEACH, CALIFORNIA.

VEHICLE-SPRINGS.

1,105,010. Specification of Letters Patent. Patented July 28, 1914.

Application filed May 12, 1913. Serial No. 767,105.

*To all whom it may concern:*

Be it known that I, ORTHELLO WATERS, a citizen of the United States, residing at Long Beach, in the county of Los Angeles and State of California, have invented certain new and useful Improvements in Vehicle-Springs, of which the following is a specification.

This invention has reference to improvements in springs employed in connection with vehicles for relieving the body of the vehicle from jars and shocks, and its object is to provide a novel combination and arrangement of springs whereby the motion is reduced and also transmitted from a vertical to a horizontal plane, thus minimizing all vertical motion, jars or jolts of the vehicle body.

In order that the invention may be better understood, reference is had to the accompanying drawing forming a part of this specification, in which drawing, Figure 1 is a side elevation of a fragment of a vehicle with the invention applied thereto. Figs. 2 and 3 are elevations showing modifications of the arrangement of springs.

In the drawing 5 denotes the body of the vehicle, and 6 indicates one of the axles of the running gear. Between these parts is interposed a series of springs to relieve the body from jars and shocks incident to the travel of the vehicle over rough roads or obstacles.

The invention is not limited to any particular kind of vehicle, but can be applied to automobiles and wagons of any style.

The drawing shows only one set of springs, but it is to be understood that other sets will be provided according to the nature and design of the vehicle.

To the body 5 is pivotally connected, as indicated at 7, one end of a spring 8 having its other end connected to the axle 6 or some other part of the running gear. This spring acts in the ordinary manner to cushion the relative vertical movement of the vehicle body and the running gear. To the vehicle body is also pivoted, at 9, an auxiliary spring 10, said spring being pivoted at one end and bearing with its free end against the spring 8, intermediate the ends of the latter. A second auxiliary spring 11 is pivoted at one end, as indicated at 12, to the vehicle body, and bears with its free end on the spring 10, intermediate the ends of the latter. This arrangement of springs, which is similar to a compound lever, results in a reduced motion of the spring 11, the extent to which the motion of said spring is reduced depending on the distance between the pivots of the springs and the points where they are engaged by the next spring above. The drawing shows the spring 10 engaging the spring 8 midway between its ends, and the spring 11 bearing on the spring 10 midway between the ends of the latter. Thus a motion of four inches at the point of attachment of the spring 8 to the running gear will be reduced to one half inch at a point midway between the ends of the spring 11, not taking into consideration the bends which take place in the springs, but considering the same only as rigid bars. To the vehicle body is also pivoted, as indicated at 13, a bell-crank or angle lever. One arm 14 of this lever engages the spring 11 midway between the ends of the latter and the other arm 15 of said lever engages a spring 16, which latter may be a leaf or any other kind of spring arranged to oppose the motion imparted to the bell-crank lever by the springs 8, 10 and 11. The bell-crank lever serves to change the motion from vertical to horizontal, the springs 8, 10 and 11 being arranged horizontally and swinging in a vertical plane.

The pivotal connections of the springs 8, 10 and 11 may be made by any suitable or preferred means, and the springs 11 and 10 may bear freely on the next spring below, or they can be connected thereto by a loose or hinge joint. The number of auxiliary springs may also be varied according to the object desired. The bell-crank lever may be left off if it is not desired to change the direction of motion, in which event the spring 16 or a similar spring may engage the spring 11.

Fig. 2 shows a modification of the arrangement of springs. A series of springs is provided which extends transversely of the vehicle. A pair of main springs 17 is provided, which springs are pivotally connected at one of their ends as indicated at 18, and connected at this point to the vehicle body 19. The other ends of the springs are connected to the axle 20 of the vehicle, a pivotal connection being provided by means of links or shackles 21. An auxiliary spring 22 is pivoted intermediate its ends, as indicated at 23, to the vehicle body, and has one of its free ends pressing against one of the main springs 17 intermediate the ends thereof, the other free end of the auxiliary spring pressing against the other main spring intermediate the ends thereof.

In the modification shown in Fig. 3 a pair of auxiliary springs 24 pivotally connected, as indicated at 25, and connected at this point to the vehicle body, is provided. One of these springs presses with its free end against one of the main springs 17 intermediate the ends thereof, and in a similar manner the other auxiliary spring engages the other main spring. An auxiliary spring 26 similar to the spring 22 is also provided, the same engaging the springs 24 in the same manner that the spring 22 in Fig. 2 engages the main spring 17.

The preferred embodiment of the invention has been shown, but it will be evident that other modifications in the arrangement of parts may be made without a departure from the spirit and scope of the invention as hereinafter claimed.

I claim:

1. The combination with the body and running gear of a vehicle; of a spring interposed between said body and running gear and pivotally connected thereto, auxiliary springs pivoted to the body, one of said auxiliary springs having its free end in engagement with the first-mentioned spring intermediate the ends thereof, and another auxiliary spring bearing with its free end against the first-mentioned auxiliary spring intermediate the ends of the latter, and a spring opposing the movement of the second-mentioned auxiliary spring.

2. The combination with the body and running gear of a vehicle; of a spring interposed between said body and running gear and pivotally connected thereto, auxiliary springs pivoted to the body, one of said auxiliary springs having its free end in engagement with the first-mentioned spring intermediate the ends thereof, and another auxiliary spring bearing with its free end against the first-mentioned auxiliary spring intermediate the ends of the latter, a bell-crank lever fulcrumed on the body and having one of its arms engageable by the second-mentioned auxiliary spring, and a spring engaging the other arm of the bell-crank lever.

3. The combination with the body and running gear of a vehicle; of a series of pivoted springs interposed between said body and running gear, said springs being in engagement with each other and arranged as a compound lever, the first spring of the series being connected to the running gear, and the last spring of the series being connected to the vehicle body, and means for supporting the vehicle body from the last-mentioned spring.

4. The combination with the body and running gear of a vehicle; of a series of pivoted springs interposed between said body and running gear and arranged as a compound lever, a bell-crank lever having one of its arms engaging the last spring of the series, and a spring engaging the other arm of the bell-crank lever.

5. The combination with the body and running gear of a vehicle; of a spring interposed between said body and running gear, an auxiliary spring arranged as a lever and connected at one end to the vehicle body, the opposite end of said auxiliary body being free and engaging the first-mentioned spring intermediate the ends thereof, and means for supporting the vehicle body from the auxiliary spring.

In testimony whereof I affix my signature in presence of two witnesses.

ORTHELLO WATERS.

Witnesses:
J. M. KERR,
F. C. BLAIR.